United States Patent
Pettersson et al.

(10) Patent No.: US 10,045,023 B2
(45) Date of Patent: Aug. 7, 2018

(54) CROSS COMPONENT PREDICTION IN VIDEO CODING

(71) Applicant: Telefonaktiebolaget L M Ericsson (publ), Stockholm (SE)

(72) Inventors: Martin Pettersson, Vallentuna (SE); Kenneth Andersson, Gävle (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 278 days.

(21) Appl. No.: 14/894,640

(22) PCT Filed: Oct. 9, 2015

(86) PCT No.: PCT/EP2015/073394
§ 371 (c)(1),
(2) Date: Nov. 30, 2015

(87) PCT Pub. No.: WO2017/059926
PCT Pub. Date: Apr. 13, 2017

(65) Prior Publication Data
US 2017/0272749 A1    Sep. 21, 2017

(51) Int. Cl.
*H04N 7/12* (2006.01)
*H04N 19/119* (2014.01)
(Continued)

(52) U.S. Cl.
CPC ......... *H04N 19/119* (2014.11); *H04N 19/136* (2014.11); *H04N 19/176* (2014.11);
(Continued)

(58) Field of Classification Search
CPC .. H04N 19/119; H04N 19/136; H04N 19/176; H04N 19/186; H04N 19/52; H04N 19/70
See application file for complete search history.

(56) References Cited

U.S. PATENT DOCUMENTS

2006/0029134 A1* 2/2006 Winder ............ H04N 13/0011
                                                         375/240.12
2006/0062454 A1* 3/2006 Fan .................... G06K 9/342
                                                         382/164
(Continued)

FOREIGN PATENT DOCUMENTS

JP    2009-534876 A    9/2009
JP    2013-518453 A    5/2013
(Continued)

OTHER PUBLICATIONS

Office Action for Japanese Patent Application No. 2017-543877 dated Dec. 5, 2017 (6 pages, including English translation).
(Continued)

*Primary Examiner* — Jessica M Prince
(74) *Attorney, Agent, or Firm* — Sage Patent Group (57) ABSTRACT

There are provided mechanisms for encoding a picture of a video sequence into a video bitstream. The picture comprises at least a first color component and a second color component. The first color component comprises a first block of samples and the second color component comprises a second block of samples. A method comprises segmenting the first block of samples and the second block of samples into at least a first segment and a second segment so that samples with the same positions in the first block and the second block belong to the same segment. The method comprises predicting sample values in the second block of samples based on the sample values in the first block of samples that belong to the same segment.

23 Claims, 6 Drawing Sheets

(51) Int. Cl.
    *H04N 19/186*    (2014.01)
    *H04N 19/136*    (2014.01)
    *H04N 19/176*    (2014.01)
    *H04N 19/70*     (2014.01)
    *H04N 19/52*     (2014.01)

(52) U.S. Cl.
    CPC ........... *H04N 19/186* (2014.11); *H04N 19/52* (2014.11); *H04N 19/70* (2014.11)

(56) References Cited

U.S. PATENT DOCUMENTS

| 2009/0190659 | A1* | 7/2009 | Lee | H04N 19/176 375/240.12 |
|---|---|---|---|---|
| 2012/0008684 | A1* | 1/2012 | Lee | H04N 19/105 375/240.12 |
| 2012/0307897 | A1* | 12/2012 | Yang | H04N 19/50 375/240.12 |
| 2013/0121415 | A1* | 5/2013 | Wahadaniah | H04N 19/50 375/240.12 |
| 2015/0264374 | A1* | 9/2015 | Xiu | H04N 19/176 375/240.25 |

FOREIGN PATENT DOCUMENTS

| WO | WO 2007/108640 A2 | 9/2007 |
|---|---|---|
| WO | WO 2011/088594 A1 | 7/2011 |

OTHER PUBLICATIONS

International Search Report and the Written Opinion of the International Searching Authority corresponding to International Patent Application No. PCT/EP2015/073394 (13 pages) (dated Apr. 12, 2016).

Young et al. "Video Compression using Inter Color Prediction Scheme" *Visual Communications and Image Processing* (11 pages) (2005).

* cited by examiner

CROSS COMPONENT PREDICTION IN VIDEO CODING

CROSS REFERENCE TO RELATED APPLICATION

This application is a 35 U.S.C. § 371 national stage application of PCT International Application No. PCT/EP2015/073394, filed on Oct. 9, 2015, the disclosure and content of which is incorporated by reference herein in its entirety.

TECHNICAL FIELD

Embodiments herein relate to the field of video coding, such as High Efficiency Video Coding (HEVC) or the like. In particular, embodiments herein relate to a method and an encoder for encoding a picture of a video sequence as well as a method and a decoder for decoding a bitstream comprising a coded picture of a video sequence. Corresponding computer programs therefor are also disclosed.

BACKGROUND

Image and video coding techniques use different color formats to represent dolor information of picture elements (pixels or samples). The color information may be expressed differently depending on the use case. For example, it is common for displays to have three color elements, Red (R), Green (G) and Blue (B), which are lit at different intensities depending on what color is to be displayed. It becomes therefore convenient to send the pixel information in RGB color format to the display. Since the signal is digital the intensity of each component of the pixel must be represented with a fixed number of bits, referred to as the bit depth of the component. A bit depth of n can represent $2^n$ different values, i.e. 256 values per component for 8 bits and 1024 values per component for 10 bits.

The YUV color format describes a color by using the luminance (luma) color component Y and two chrominance (chroma) color components U and V (or Cb and Cr respectively). The luminance color component (Y) represents the brightness whereas the chrominance components (U and V) contain the color differences. Representation of a pixel in YUV (YCbCr) format is convenient for video coding. Namely, the human visual system (HVS) is more sensitive to luminance than to chrominance, meaning that luminance can be represented with higher accuracy than chrominance.

Since the HVS is not equally sensitive to all levels of luminance in linear light intensity the video is usually transferred into a perceptual domain Y'UV (Y'CbCr) where Y' is referred to as luma. The conversion between RGB and Y'UV for HDTV is to be made using the following matrix multiplications:

$$\begin{bmatrix} Y' \\ U \\ V \end{bmatrix} = \begin{bmatrix} 0.2126 & 0.7152 & 0.0722 \\ -0.09991 & -0.33609 & 0.436 \\ 0.615 & -0.55861 & -0.05639 \end{bmatrix} \begin{bmatrix} R \\ G \\ B \end{bmatrix}$$

$$\begin{bmatrix} R \\ G \\ B \end{bmatrix} = \begin{bmatrix} 1 & 0 & 1.28033 \\ 1 & -0.21482 & -0.38059 \\ 1 & 2.12798 & 0 \end{bmatrix} \begin{bmatrix} Y' \\ U \\ V \end{bmatrix}$$

Fourcc.org holds a list of defined YUV and RGB formats. The most commonly used pixel format for standardized video codecs (e.g. H.264/AVC, MPEG-4, HEVC) is Y'UV 4:2:0 (aka YV12 or Y'CbCr 4:2:0) planar where the U and V chrominance components are subsampled in both vertical and horizontal direction and the Y', U and V components are stored in separate chunks for each picture. Thus for a bit depth of 8 bits per component, the number of bits per pixel is 12 where 8 bits represents the luminance and 4 bits the two chrominance components. A pixel format that does not have sub-sampling in any of its components is referred to have a 4:4:4 sampling format, e.g. Y'CbCr 4:4:4 or RGB 4:4:4.

The High Efficiency Video Coding (HEVC), also known as H.265 has a Cross-Component Prediction (CCP) tool for predicting the residuals of the chrominance blocks of samples (pixels) from the residuals of the luminance blocks of samples (pixels). The tool was initially proposed during the development of H.265/HEVC RExt that supports higher bit depths and 4:2:2 and 4:4:4 chroma sampling formats for the HEVC.

The residual of a chroma component is calculated as:

$$r_{CR} = \hat{r}_{CR} - \alpha \cdot \hat{r}_{CM}$$

where $\hat{r}_{CM}$ is the luminance component residual, $\hat{r}_{CR}$ is the residual of the remaining component at the same spatial location and $\alpha$ is a weighting factor. The $\alpha$ parameter is signaled at the block level in the bitstream for each of the two chroma components.

Chroma Intra Prediction using Linear Model (LM) is another tool proposed during the development of HEVC. With this tool the samples of a chroma block are predicted from the reconstructed downsampled luma samples by using a linear model as follows:

$$\text{pred}_C(i,j) = \alpha \cdot \text{rec}_L(i,j) + \beta$$

where $\text{pred}_C(i, j)$ is the chroma sample to be predicted, $\text{rec}_L(i, j)$ is the corresponding downsampled reconstructed luma sample, and $\alpha$ and $\beta$ are the model parameters. The values of $\alpha$ and $\beta$ are derived from the reconstructed neighboring samples of the current block. The normalized covariance between luma and chroma reference samples is calculated and taken as $\alpha$. The offset $\beta$ is obtained by fitting the linear model to the reference samples, utilizing the function above given the known $\alpha$.

Contribution ITU-T COM16C 806E investigates a number of tools that show large improvements over HEVC. This contribution later becomes the KTA test model for the initial development of the next generation video codec after HEVC. One of the tools in KTA is the Chroma Intra Prediction using Linear Model (LM), with the addition that the residual of one of the chroma components may also be predicted from the residual of the other chroma component according to:

$$\text{pred}_{Cr^*}(i,j) = \text{pred}_{Cr}(i,j) + \alpha \cdot \text{resi}_{Cb}(i,j)$$

SUMMARY

State of the art cross component prediction methods, such as the cross-component prediction and the chroma intra prediction using linear model rely on that most chrominance samples in a block have the same linear relationship to the luminance samples. This is sometimes true in the RGB color space where each one of the R, G and B components to some degree contains the intensity of the luminance component. For Y'CbCr the components are decoupled from each other in a different way. This is exemplified in FIG. 1 where a grey-scale version of a picture as well as its each component in Y'UV and RGB is shown for a 16×16 block of samples.

Figure 1:
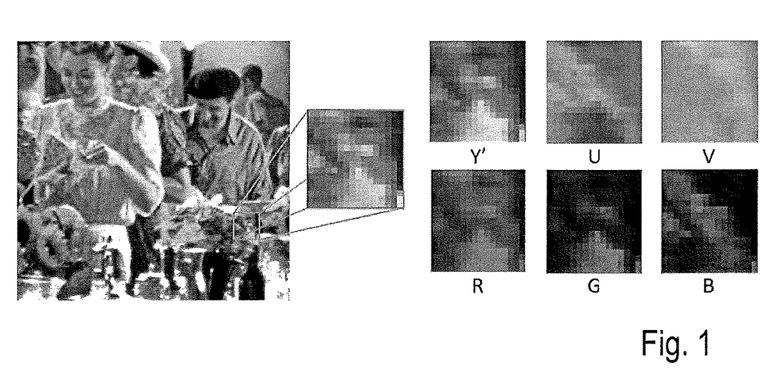
FIG. 1 illustrates and example of the non-linearity between the luminance and chrominance components.

The CCP and the chroma intra prediction using linear model may still work well for blocks with solid colors. However, in blocks with two or more colors as in the example above it may not work as well due to the non-linearity between the components. This is illustrated in FIG. 1.

Assuming a linear relationship between different color components may result in a bad quality prediction in cases where the relationship is not as assumed. Bad quality of prediction may imply larger difference between the original block of samples and the predicted block of samples, which further implies a higher bitrate in such cases.

Thus, in order to reduce the bitrate, it is of utter importance that the blocks of samples are predicted as accurately as possible.

This and other objectives are met by embodiments as disclosed herein.

A first aspect of the embodiments defines a method, performed by an encoder, for encoding a picture of a video sequence into a bitstream. The picture comprises at least a first color component and a second color component, wherein the first color component comprises a first block of samples and the second color component comprises a second block of samples. The method comprises segmenting the first block of samples and the second block of samples into at least a first segment and a second segment so that samples with the same positions in the first block and the second block belong to the same segment. The method comprises predicting sample values in the second block of samples based on the sample values in the first block of samples that belong to the same segment.

A second aspect of the embodiments defines an encoder for encoding a picture of a video sequence into a bitstream. The picture comprises at least a first color component and a second color component, wherein the first color component comprises a first block of samples and the second color component comprises a second block of samples. The encoder comprises processing means operative to segment the first block of samples and the second block of samples into at least a first segment and a second segment so that samples with the same positions in the first block and the second block belong to the same segment. The encoder comprises processing means operative to predict sample values in the second block of samples based on the sample values in the first block of samples that belong to the same segment.

A third aspect of the embodiments defines a computer program for encoding a picture of a video sequence. The picture comprises at least a first color component and a second color component, wherein the first color component comprises a first block of samples and the second color component comprises a second block of samples. The computer program comprises code means which, when run on a computer, causes the computer to segment the first block of samples and the second block of samples into at least a first segment and a second segment so that samples with the same positions in the first block and the second block belong to the same segment. The computer program comprises code means which, when run on a computer, causes the computer to predict sample values in the second block of samples based on the sample values in the first block of samples that belong to the same segment.

A fourth aspect of the embodiments defines a computer program product comprising computer readable means and a computer program, according to the third aspect, stored on the computer readable means.

A fifth aspect of the embodiments defines a method, performed by a decoder, for decoding a bitstream comprising a coded picture of a video sequence. The coded picture comprises at least a first coded color component and a second coded color component, wherein the first coded color component comprises a first coded block of samples and the second coded color component comprises a second coded block of samples. The method comprises segmenting the first coded block of samples and the second coded block of samples into at least a first and a second segment. The method comprises predicting sample values in the second coded block of samples based on the sample values in the first coded block of samples that belong to the same segment.

A sixth aspect of the embodiments defines a decoder for decoding a bitstream comprising a coded picture of a video sequence. The coded picture comprises at least a first coded color component and a second coded color component, wherein the first coded color component comprises a first coded block of samples and the second coded color component comprises a second coded block of samples. The decoder comprises processing means operative to segment the first coded block of samples and the second coded block of samples into at least a first and a second segment. The decoder comprises processing means operative to predict sample values in the second coded block of samples based on the sample values in the first coded block of samples that belong to the same segment.

A seventh aspect of the embodiments defines a computer program for decoding a bitstream comprising a coded picture of a video sequence. The coded picture comprises at least a first coded color component and a second coded color component, wherein the first coded color component comprises a first coded block of samples and the second coded color component comprises a second coded block of samples. The computer program comprises code means which, when run on a computer, causes the computer to segment the first coded block of samples and the second coded block of samples into at least a first and a second segment. The computer program comprises code means which, when run on a computer, causes the computer to predict sample values in the second coded block of samples from the sample values in the first coded block of samples that belong to the same segment.

An eighth aspect of the embodiments defines a computer program product comprising computer readable means and a computer program, according to the seventh aspect, stored on the computer readable means.

Advantageously, at least some of the embodiments provide more accurate prediction between different color components of a video sequence.

Further advantageously, at least some of the embodiments provide higher compression efficiency.

It is to be noted that any feature of the first, second, third, fourth, fifth, sixth, seventh and eighth aspects may be applied to any other aspect, whenever appropriate. Likewise, any advantage of the first aspect may equally apply to the second, third, fourth, fifth, sixth, seventh and eighth aspect respectively, and vice versa. Other objectives, features and advantages of the enclosed embodiments will be apparent from the following detailed disclosure, from the attached dependent claims and from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention, together with further objects and advantages thereof, may best be understood by making reference to the following description taken together with the accompanying drawings, in which.

DETAILED DESCRIPTION

The accompanying drawings, which are incorporated herein and form part of the specification, illustrate various embodiments of the present invention and, together with the description, further serve to explain the principles of the invention and to enable a person skilled in the art to make and use the invention. Throughout the drawings, the same reference numbers are used for similar or corresponding elements.

Throughout the description, the terms "video" and "video sequence", "block of samples" and "block", "pixel" and "sample", "luminance" and "luma", "chrominance" and "chroma" are interchangeably used.

Even though the description of the invention is based on the HEVC codec, it is to be understood by a person skilled in the art that the invention could be applied to any other state-of-the-art and a future block-based video coding standard.

The present embodiments generally relate to a method and an encoder for encoding a picture of a video sequence into a bitstream as well as a method and a decoder for decoding a bitstream comprising a coded picture of a video sequence.

HEVC is a block based video codec standardized by ITU-T and MPEG that utilizes both temporal and spatial prediction. Spatial prediction is achieved using intra (I) prediction from within the current picture. Temporal prediction is achieved using inter (P) or bi-directional inter (B) prediction on block level from previously decoded reference pictures. The difference between the original pixel data and the predicted pixel data, referred to as the prediction error, is transformed into the frequency domain and quantized and entropy encoded (e.g. with Context-adaptive Binary Arithmetic Coding (CABAC) in case of HEVC or Context-adaptive Variable Length Coding (CAVLC) in case of e.g. H.264/AVC) before transmitted together with necessary prediction parameters such as mode selections and motion vectors after entropy encoding them. By quantizing the transformed prediction error the tradeoff between bitrate and quality of the video may be controlled. The level of quantization is determined by the quantization parameter (QP). The decoder performs entropy decoding, inverse quantization and inverse transformation to obtain a decoded version of the prediction error, referred to as the residual, and then adds the residual to an intra or inter prediction to reconstruct a picture.

CCP is a tool in HEVC for predicting the residuals of the chroma blocks from the residuals of the luma blocks. The residual of a chroma component is calculated as:

$$r_{CR} = \hat{r}_{CR} - \alpha \cdot \hat{r}_{CM}$$

where $\hat{r}_{CM}$ is the luma component residual, $\hat{r}_{CR}$ is the residual of the remaining component at the same spatial location and α is a weighting factor. The α parameter (denoted as ResScaleVal in the standard specification and in the text below) is split into two parameters, log2_res_scale_abs_plus1 and res_scale_sign_flag, and is signaled at the block level in the bitstream for each of the two chroma components, as described in section 7.3.8.12 in HEVC (H.265) specification [1] and as shown in Table 1:

TABLE 1

Signaling of parameters related to CCP.

| cross_comp_pred( x0, y0, c ) { | Descriptor |
|---|---|
|   log2_res_scale_abs_plus1[ c ] | ae(v) |
|   if( log2_res_scale_abs_plus1[ c ] != 0) | |
|     res_scale_sign_flag[c] | ae(v) |
| } | |

According to this table, log2_res_scale_abs_plus1[c] minus 1 specifies the base 2 logarithm of the magnitude of the scaling factor ResScaleVal used in cross-component residual prediction. When not present, log2_res_scale_abs_plus1 is inferred to be equal to 0.

In addition, res_scale_sign_flag[c] specifies the sign of the scaling factor used in cross-component residual prediction as follows: if res_scale_sign_flag[c] is equal to 0, the corresponding ResScaleVal has a positive value. Otherwise (res_scale_sign_flag[c] is equal to 1), the corresponding ResScaleVal has a negative value.

The variable ResScaleVal[cIdx][x0][y0] specifies the scaling factor used in cross-component residual prediction. The array indices x0, y0 specify the location (x0, y0) of the top-left luma sample of the considered transform block relative to the top-left luma sample of the picture. The array index cIdx specifies an indicator for the colour component; it is equal to 1 for Cb and equal to 2 for Cr.

The variable ResScaleVal[cIdx][x0][y0] is derived as follows: if log2_res_scale_abs_plus1[cIdx−1] is equal to 0, the following applies: ResScaleVal[cIdx][x0][y0]=0. Otherwise (log2_res_scale_abs_plus1[cIdx−1] is not equal to 0), the following applies:

$$ResScaleVal[cIdx][x0][y0]= (1<<(log2\_res\_scale\_abs\_plus1[cIdx-1]-1))* (1-2*res\_scale\_sign\_flag[cIdx-1]).$$

ResScaleVal (or equivalently α) could thus take on the following values {−8, −4, −2, −1, 0, 1, 2, 4, 8}.

In HEVC, CCP is only specified for 4:4:4 sample formats.

The CCP and chroma intra prediction using linear model use linear modelling to predict the residuals or samples of the chroma blocks of samples from the residuals or samples from the corresponding luma block of samples. However, the relationship between the chroma and luma blocks is not necessarily linear over the whole block of samples, especially when the block of samples includes more than one color.

The idea of the embodiments of the present invention is to segment a block of samples into two or more segments and treat every segment separately when using the method of CCP, chroma intra prediction using a linear model or a similar method.

Figure 2:
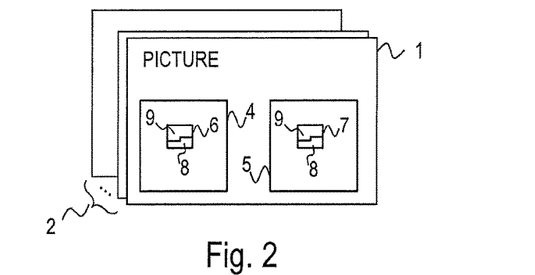
FIG. 2 illustrates a picture to be encoded according to embodiments of the present invention.
Figure 3:
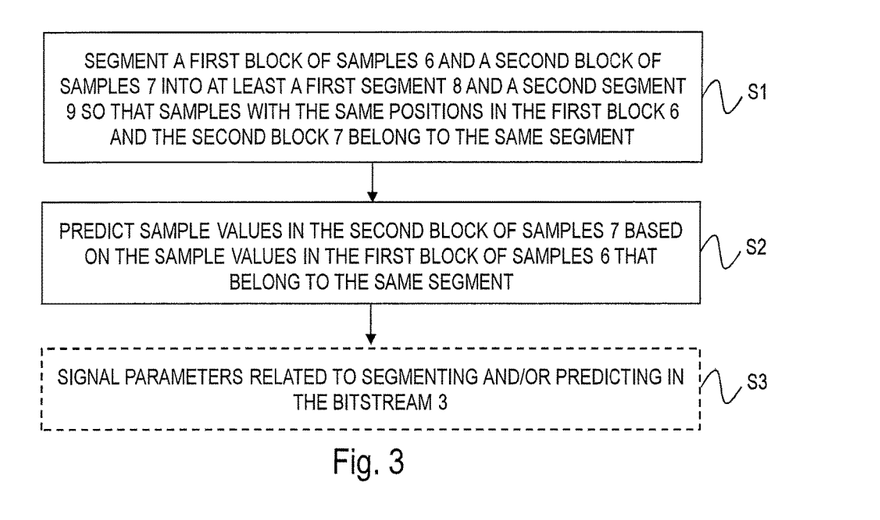
FIG. 3 illustrates a flowchart of a method of encoding a picture of a video sequence, according to embodiments of the present invention.

According to one aspect, a method performed by an encoder 100 for encoding a picture of a video sequence into a bitstream is provided, as described in FIG. 3. The picture 1, as shown in FIG. 2, comprises at least a first color component 4 and a second color component 5, wherein the first color component 4 comprises a first block of samples 6 and the second color component 5 comprises a second block of samples 7. The method comprises the step S1 of segmenting the first block of samples 6 and the second block of samples 7 into at least a first segment 8 and a second segment 9 so that samples with the same picture positions in the first block of samples 6 and the second block of samples 7 belong to the same segment. The method further comprises the step S2 of predicting the sample values in the second block of samples 7 based on the sample values in the first block of samples 6 that belong to the same segment. The method further optionally comprises the step S3 of signaling the parameters related to segmenting S1 and/or signaling the parameters related to predicting S2 in the bitstream 3.

The first color component may be the luminance color component and the second color component may be the chrominance color component. In that case, and as usually done in practice, a block of samples from the chrominance color component is predicted from the corresponding block of samples from the luminance color component. However, the embodiments of the present invention are not restricted to prediction of a chrominance color component from the luminance color component only: it is also envisaged that luminance color component may use chrominance color component for prediction. Some of the embodiments are described below.

A block of samples may originate from different steps in a coding process. For example, the block of samples may originate from a picture to be encoded. The block of samples may originate from intra/inter prediction. Alternatively, the block of samples may correspond to a residual block of samples. Yet another alternative is that the block of samples is a combination of intra/inter prediction and a residual block of samples.

Segmenting the first and the second block of samples may be performed by thresholding. In that case, segmenting is performed such that samples having a value smaller than a threshold value belong to one segment and samples having a value larger than or equal to the threshold value belong to another segment. The threshold may be chosen as the average of sample values in a block of samples, the median or some other measure. In case when the number of segments is larger than two, multiple threshold values may be defined and similar procedure may be applied to assign samples to segments.

Alternatively, segmenting may be performed by using one of: edge detection, Otsu's thresholding method, color-based segmentation, K-means clustering, image texture filters and spatial transform-based segmentation methods.

Figure 4:
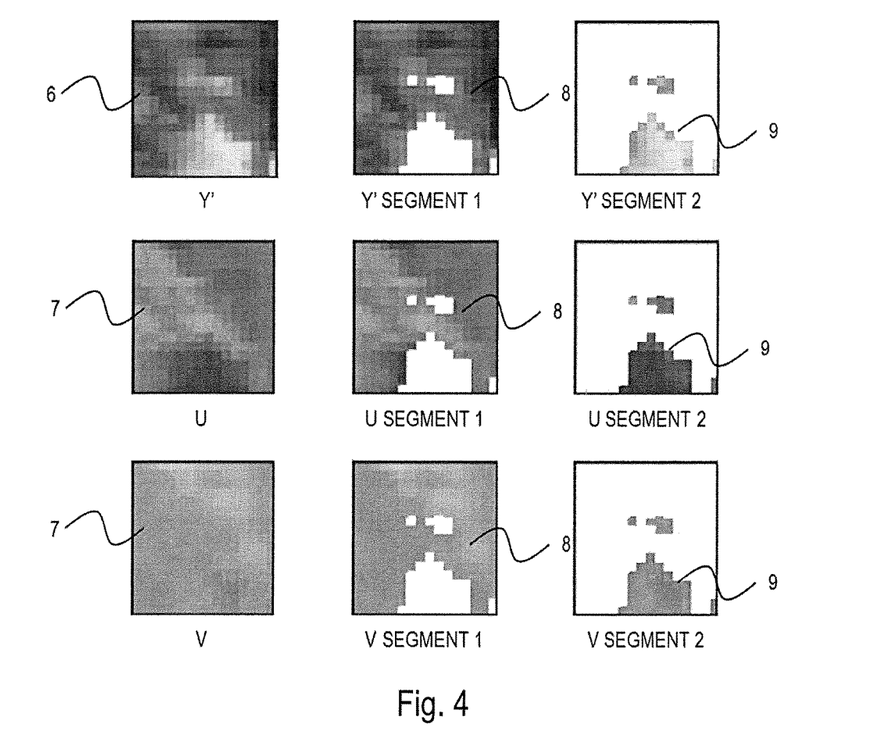
FIG. 4 illustrates an example of segmentation based on thresholding of the sample values in the luminance block of samples. In this particular example the threshold value 150 was manually selected.

According to one embodiment, segmentation is performed only on the first block of samples, whereas the segments from this block of samples are copied to the second block of samples such that samples with the same positions in the first block of samples and the second block of samples belong to the same segment. This is depicted in FIG. 4, where the segmentation is performed by thresholding the sample values in the luminance block Y', giving two segments: Y' segment 1 and Y' segment 2, as can be seen in the top row of the figure. The same segmentation pattern is then repeated in the second block of samples. The segmentation pattern may take on any shape, i.e. it does not need to be rectangular, and does not need to be connected as illustrated by segment 2 in FIG. 4. The middle row of FIG. 4 corresponds to the case when the second block of samples is the U chrominance component, where the corresponding segments U segment 1 and U segment 2 can also be seen. Similarly, the bottom row shows an example of the segmented V chrominance block of samples.

After segmenting the first block of samples and the second block of samples into at least the first and the second segment, the sample values in the second block of segments are predicted based on the sample values in the first block of samples that belong to the same segment. Prediction may be done by using a linear model for example, as is done in CCP and chroma intra prediction using a linear model.

The segmenting S1 and predicting S2 step described above are performed at the encoder side. In order for a decoder to perform the same steps when reconstructing a video sequence, some of the parameters related to segmentation and/or prediction may need to be transmitted to the decoder side. This may be done by signaling these parameters in a bitstream, as will be illustrated below.

According to one embodiment, segmentation of a luminance block of samples is based on selecting a threshold value for this block of samples. The sample values of the luminance block of samples that are below the threshold value are assigned to the first segment while the samples values of the luminance block of samples that are larger than or equal to the threshold is assigned to a second segment. FIG. 4 illustrates this. The threshold value could be derived at the decoding side in the same way as it is done at the encoder (e.g. the average of sample values from a block of samples). However, the threshold may also be signaled in the bitstream, as will be shown below.

Following the segmentation, the sample values in the first segment of the chrominance block of samples are predicted based on the sample values in the first segment of the luminance block of samples. The prediction may be based on CCP, in which case a coefficient $\alpha_1$ (ResScaleVal1) for the first segment is obtained. Similarly, the sample values in the second segment of the chrominance block of samples are predicted based on the sample values in the second segment of the luminance block of samples. This prediction gives a coefficient $\alpha_2$ (ResScaleVal2) for the second segment.

An example of how signaling could be done when extending CCP with segmentation and different prediction for different segments is illustrated in Table 2, where the changes compared to CCP in HEVC are marked in grey.

TABLE 2

Example of modifying the signaling of CCP at a block level to handle two segments derived based on a signaled segment threshold and two prediction coefficients.

| | Descriptor |
|---|---|
| cross_comp_pred( x0, y0, c ) { | |
|   log2_res_scale_abs_plus1[ c ] | ae(v) |
|   if( log2_res_scale_abs_plus1[ c ] != 0 ) | |
|     res_scale_sign_flag[ c ] | ae(v) |
|   do_segment_block[ c ] | u(1) |
|   if( do_segment_block[ c ] ) { | |
|     segment_threshold[ c ] | ae(v) |
|     log2_res_scale_abs_seg2_plus1[ c ] | ae(v) |
|     if( log2_res_scale_abs_plus1[ c ] != 0 ) | |
|       res_scale_sign_seg2_flag[ c ] | ae(v) |
|   } | |
| } | |

The parameters log2_res_scale_abs_plus1 and res_scale_sign_flag relate to the coefficient ResScaleVal1 obtained in prediction of the first segment in the chrominance block of samples. These parameters are defined on the entire block of samples in HEVC.

The do_segment_block indicates whether segmentation is to be performed in CCP for the current block of samples. If it is, then the segment_threshold is signaled. In addition, the parameters log2_res_scale_abs_seg2_plus1 and res_scale_sign_seg2_flag related to prediction coefficient ResScaleVal2 for the second segment are signaled.

The signaled segment_threshold value may be an absolute value, calculated from the sample values in the block of samples. Alternatively, it may be signaled as a relative value compared to the segment_threshold values in the neighboring blocks of samples, in which case it is calculated as a function of the segment_threshold values from the neighboring blocks, such as the average or the median value.

Alternatively, segment_threshold may not be signaled for each block of samples, but may be calculated on a group of blocks of samples. For example, it may be calculated for groups of m blocks of samples and signaled for each m-th block of samples, where m≥2. This may be an efficient solution when the neighboring blocks of samples have similar structure.

In an alternative version of the embodiment where the segment threshold is derived from the luma residual or sample block at the decoding side, the parameter segment_threshold does not need to be signaled. This is illustrated in Table 3:

TABLE 3

Example of modifying the signaling of CCP at block level to handle two segments derived based on a segment threshold derived at the decoder side, and two prediction coefficients.

| | Descriptor |
|---|---|
| cross_comp_pred( x0, y0, c ) { | |
|   log2_res_scale_abs_plus1[ c ] | ae(v) |
|   if( log2_res_scale_abs_plus1[ c ] != 0 ) | |
|     res_scale_sign_flag[ c ] | ae(v) |
|   do_segment_block[ c ] | u(1) |
|   if( do_segment_block[ c ] ) { | |
|     log2_res_scale_abs_seg2_plus1[ c ] | ae(v) |
|     if( log2_res_scale_abs_plus1[ c ] != 0 ) | |
|       res_scale_sign_seg2_flag[ c ] | ae(v) |
|   } | |
| } | |

In an alternative version of this embodiment the segmentation may be performed on the block of samples to be predicted rather than on the block of samples that is used for prediction. That is, segmentation may be performed on a chrominance block of samples, and the segments in this block may be predicted based on the corresponding segments in the luminance block of samples.

In HEVC, CCP is only specified for 4:4:4 sampling formats. However, the embodiments of the present invention would also work for other formats where the sub-sampling is different between the components such as in 4:2:2 or 4:2:0 sampling formats. In 4:2:2 the second and third components are sub-sampled by a factor of two in horizontal direction only. In 4:2:0 the second and third components are sub-sampled by a factor of two in both horizontal and vertical directions. In order to predict the sample values in the second block of samples based on the sample values in the first block of samples, the samples in the first block of samples would need to be sampled to the size of the corresponding block of samples in the second block of samples. For instance, when predicting the sample values in the chrominance block of samples from the sample values in the luminance block of samples in Y'CbCr 4:2:0, the samples in the luminance block of samples have to be downsampled to the size of the block of samples in the chrominance block of samples. The downsampling needs to be specified so the decoder can derive the same downsampled luminance block of samples as the encoder. It should also be noted that the segmentation may be performed on the downsampled block of samples in the chrominance component.

Figure 5:
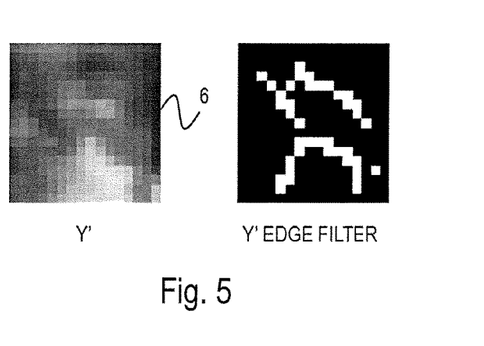
FIG. 5 illustrates an example of segmentation by edge detection where the edge detection filter is the "Canny" filter.

In another embodiment of the present invention the segments are determined by using edge detection on the first block of samples. The edge detection filter could for instance be one of Sobel filter, Canny filter, Prewitt filter, Roberts filter, Laplacian of Gaussian filter or Zero-cross filter. An example of detected edges in a luminance block of samples with the Canny filter is shown in FIG. 5. Once the edges have been detected the segments could be determined by filling one of the sides of an edge. If the edges are closed, the samples that are in an area closed by the same edges are assigned to the same segment. In case the edges are not closed, one may apply some kind of morphological operations to close them, after which assigning the segments is performed in the same way. Whether a closed area belongs to the first segment or the second segment could be determined by calculating the average value for the samples of each of two neighboring closed areas and assigning the closed area with the lowest average to the first segment and the closed area with the highest average to the second segment. In case a closed area has a neighboring closed area with lower average value and another neighboring closed area with higher average value, the samples of the current closed area will be assigned to the neighboring closed area with average value closest to the average value of the current closed area.

Other ways of deriving the segments include the following segmentation methods: the Otsu's thresholding method, color-based segmentation such as K-means clustering, transform methods such as watershed segmentation or image texture filters.

According to this embodiment, the parameters related to any of the edge detection or segmentation method mentioned above may be signaled in the bitstream in order for the same steps to be performed at the decoder.

Additionally, according to this embodiment, segmentation with any of the mentioned methods may be applied both on the luminance block of samples as well as the chrominance block of samples. Moreover, it is envisaged that both the chrominance block of samples is predicted based on the luminance block of samples and vice versa.

In another embodiment of the present invention the segments are determined at the encoder side and signaled as a binary mask in the bitstream. Table 4 illustrates how signaling of the segments by using a segment_mask can be done.

TABLE 4

Example of modifying the signaling of CCP at block level
to signal two segments using a binary segment mask

| | Descriptor |
|---|---|
| cross_comp_pred( x0, y0, size_x, size_y, c ) { | |
|   log2_res_scale_abs_plus1[ c ] | ae(v) |
|   if( log2_res_scale_abs_plus1[ c ] != 0 ) | |
|     res_scale_sign_flag[ c ] | ae(v) |
|   do_segment_block[ c ] | u(1) |
|   if( do_segment_block[ c ] ) { | |
|     for( i = 0; i <= size_x * size_y; i++ ) | |
|       segment_mask[ i ] | u(1) |
|     log2_res_scale_abs_seg2_plus1[ c ] | ae(v) |
|     if( log2_res_scale_abs_plus1[ c ] != 0 ) | |
|       res_scale_sign_seg2_flag[ c ] | ae(v) |
|   } | |
| } | |

Here size_x and size_y denote the dimensions of samples in the block of samples in the horizontal and vertical direction respectively. For example, in case of a 16×16 block of samples, size_x=size_y=16. The parameter segment_mask can take values 0 and 1 for each sample in the block of samples and tells whether a sample belongs to the segment mask (value 1) or not (value 0). The parameters log2_res_scale_abs_seg2_plus1 and res_scale_sign_seg2_flag related to prediction coefficient ResScaleVal2 of the second segment are defined in the same way as in the embodiment above.

The segment_mask may also be differentially encoded. Alternatively, it may be encoded using run length coding. Scanning order may be horizontal or vertical raster scan or Z-scan. The segment mask may also be entropy encoded with arithmetic coding such as CABAC in HEVC.

In one version of this embodiment the binary mask is downsampled to a lower resolution before it is encoded. At the decoding side it is upsampled to its original resolution before the segmentation is applied.

Figure 6:
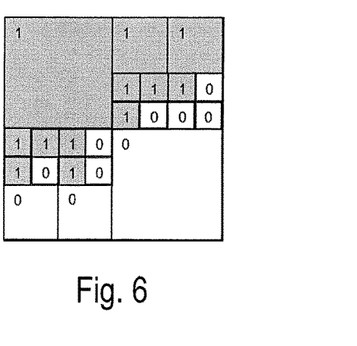
FIG. 6 illustrates an example of an 8×8 binary mask encoded using a quad tree structure. 0 represents the first segment and 1 represents the second segment.

In yet another version of the embodiment, the binary mask is encoded using a quad tree structure similar to the coding unit (CU) quad tree structure in HEVC where a block is divided into four smaller blocks when a split flag is set. An example of how this could be done is illustrated in FIG. 6.

In the quad tree segment mask example above the following bits would need to be encoded if the quad tree is traversed in Z-scan order.
Split flags: 1 0 1 0011 1 1100 0
Segment IDs: 1 1 1 1110 1000 1110 1010 0 0 0

Without the quad tree structure for the binary mask the following bits would need to be encoded:
Segment IDs: 11111111 11111111 11111110 11111000 11100000 10100000 00000000 00000000

The quad tree segment mask may be entropy encoded with arithmetic coding such as CABAC in HEVC. Different CABAC contexts could be assigned to the split flags and the segment IDs.

In the embodiments above, the parameters to be signaled have been exemplified by modifying the CCP syntax in HEVC. However, it is to be understood that the parameters may similarly be signaled for other types of predictions. For example, in case of chroma intra prediction with linear model (LM) parameters $\alpha_1$, $\beta_1$, $\alpha_2$ and $\beta_2$ would need to be signaled, and each of them may similarly be represented by the respective base 2 logarithm of the magnitude and the sign of the parameter.

The segmentation parameters and the prediction parameters may also be signaled in Picture Parameter Set (PPS), Sequence Parameter Set (SPS), slice header or block header.

In the examples above, the block size of 16×16 samples has been used when segmenting the blocks. However, the segmentation may be applied for different block sizes, depending on the size of the current coding unit (CU), e.g. 8×8, 16×16, 32×32, 64×64, etc.

Figure 7:
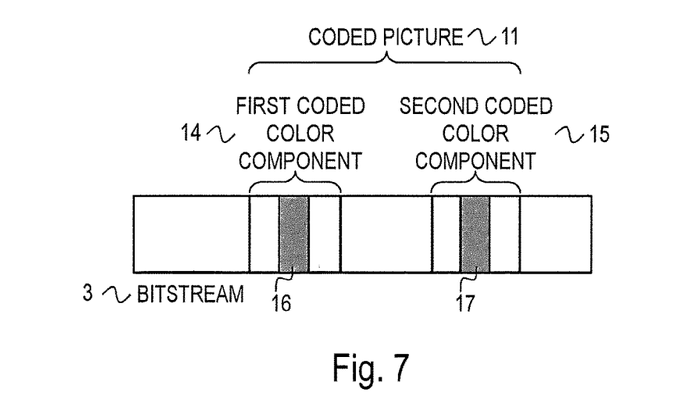
FIG. 7 illustrates a bitstream to be decoded according to embodiments of the present invention.
Figure 8:
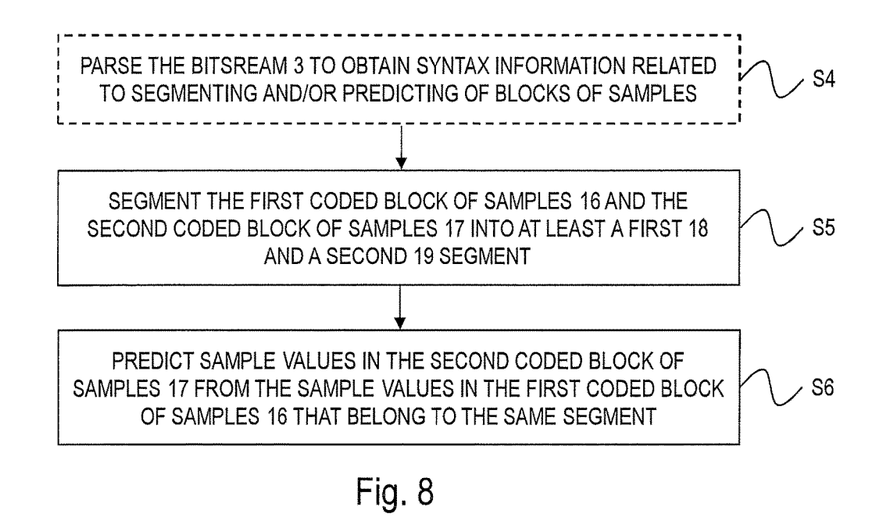
FIG. 8 illustrates a flowchart of a method of decoding a picture of a video sequence, according to embodiments of the present invention.

According to one aspect, a method performed by a decoder 200, for decoding a bitstream comprising a coded picture of a video sequence is provided, as shown in FIG. 8. The coded picture 11, as shown in FIG. 7, comprises at least a first coded color component 14 and a second coded color component 15, wherein the first coded color component 14 comprises a first coded block of samples 16 and the second coded color component 15 comprises a second coded block of samples 17. The method comprises a step S5 of segmenting the first coded block of samples 16 and the second coded block of samples 17 into at least a first 18 and a second 19 segment. The method further comprises a step S6 of predicting sample values in the second coded block of samples 17 from the sample values in the first coded block of samples 16 that belong to the same segment.

The method optionally comprises the step S4 of parsing the bitstream 3 to obtain syntax information related to segmenting and/or predicting of coded blocks of samples. This step is performed prior to step S5, as illustrated in FIG. 8.

The first coded color component 14 may be a coded luminance color component and the second coded color component 15 may be a coded chrominance color component. In that case, which is usual in practice and as described above, a coded block of samples from the coded chrominance component is predicted from the corresponding coded block of samples from the coded luminance component. However, the embodiments of the present invention are not restricted to prediction of a coded chrominance color component from the coded luminance color component only: it is also envisaged that the coded luminance color component may use the coded chrominance color component for prediction.

The first coded block of samples 16 may originate from different steps in a coding process. For example, the first coded block of samples 16 may originate from a decoded picture. The first coded block of samples 16 may originate from coded intra/inter prediction. Alternatively, the first coded block of samples 16 may correspond to a coded residual block of samples. Yet another alternative is that the first coded block of samples 16 is a combination of coded intra/inter prediction and coded residual block of samples.

The information on which segment a sample in a coded block of samples belongs to may be derived at the decoding side or may be signaled in a bitstream. For example, as shown in Table 2 above, it is possible to signal a threshold value to be used when performing segmentation at the decoder. In that case, the same threshold is used both at the encoder and the decoder. Another option is not to signal the exact threshold value, but to perform segmentation at the decoder based on the decoded sample values. The threshold can be taken as the mean or median of the sample values in a block of samples, or by any other method. However, in this case it is important that the encoder and the decoder use the same method when determining the threshold value, which can be ensured by signaling how to derive the threshold at the decoder. Alternatively, as was described above, the exact information on which segment a sample belongs to may be signaled, e.g. by using a segmentation mask.

Alternatively, segmenting may be performed by using one of: edge detection, Otsu's thresholding method, color-based segmentation, K-means clustering, image texture filters and spatial transform-based segmentation methods. In this case, the parameters related to any of the edge detection or segmentation method mentioned above are signaled in the bitstream in order for the decoder to perform the same steps as the steps performed at the encoder.

According to one embodiment, segmentation is performed only on the first coded block of samples 16, whereas the segments from this block of samples are copied to the second coded block of samples 17 such that samples with the same positions in the first block of samples 16 and the second block of samples 17 belong to the same segment.

The sample values in the second coded block of samples 17 in at least one of the segments are predicted based on the sample values in the corresponding segment in the first coded block of samples 16. This can be done e.g. by using a linear model. CCP and the chroma intra prediction using a linear model (LM) are just some of the examples of linear prediction models. In case of CCP, the prediction coefficients may be signaled to the decoder so that it can perform prediction based on the same prediction parameters as the encoder. This signaling is described above. The prediction parameters may be signaled similarly for any other prediction method.

Figure 9:
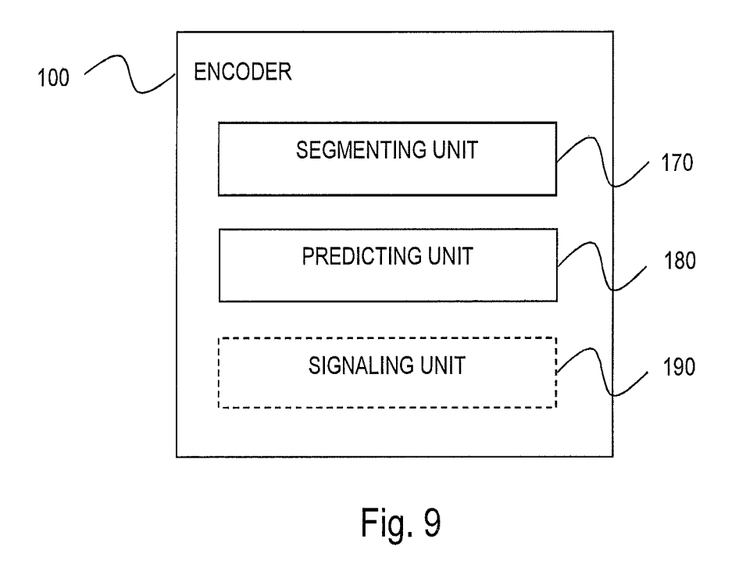
FIGS. 9 and 11 depict a schematic block diagram illustrating functional units of an encoder for encoding a picture of a video sequence according to embodiments of the present invention.

FIG. 9 is a schematic block diagram of an encoder 100 for encoding a picture of a video sequence into a video bitstream. The picture 1, as shown in FIG. 2, comprises at least a first color component 4 and a second color component 5, wherein the first color component 4 comprises a first block of samples 6 and the second color component 5 comprises a second block of samples 7. The encoder comprises segmenting unit 170, configured to segment the first block of samples 6 and the second block of samples 7 into at least a first segment 8 and a second segment 9 so that samples with the same picture positions in the first block 6 and the second block 7 belong to the same segment. The encoder further comprises predicting unit 180 configured to predict sample values in the second block of samples 7 based on the sample values in the first block of samples 6 that belong to the same segment. The encoder may optionally comprise signaling unit 190 configured to signal the parameters related to segmenting and/or predicting in the bitstream. The segmenting 170, predicting 180 and signaling 190 units may be hardware based, software based (in this case they are called segmenting, predicting and signaling modules respectively) or may be a combination of hardware and software.

The encoder 100 may be an HEVC or H.264/AVC based encoder, or any other state of the art encoder that utilizes prediction of one color component based on another color component.

The segmenting unit 170 may segment a block of samples by thresholding so that samples having a value smaller than a threshold value belong to one segment and samples having a value larger than or equal to the threshold value belong to another segment. The segmenting unit 170 may also segment a block of samples by using one of: edge detection, Otsu's thresholding method, color-based segmentation, K-means clustering, image texture filters and spatial transform-based segmentation methods. The segmenting unit 170 may segment the first block of samples 6 with one of the mentioned techniques and then segment the second block of samples 7 such that samples with the same picture positions in the first block of samples 6 and the second block of samples 7 belong to the same segment.

The predicting unit 180 may use a linear model to predict sample values in the second block of samples 7 based on the sample values in the first block of samples 6. The predicting unit may use the cross-component prediction (CCP) tool defined in HEVC to obtain prediction coefficients $\alpha_1$ (ResScaleVal1) and $\alpha_2$ (ResScaleVal2) for the two segments. According to the present invention, the predicting unit predicts sample values in the first segment 8 of the second block of samples 7 from the sample values in the first segment 8 in the first block of samples 6. In addition, the predicting unit predicts sample values in the second segment 9 in the second block of samples 7 based on the sample values in the second segment 9 in the first block of samples 6. Therefore, the predicting unit determines two prediction coefficients, ResScaleVal1 and ResScaleVal2. The predicting unit may use any other linear model for prediction of sample values in the second block of samples 7 based on the sample values in the first block of samples 6 that belong to the same segment, such as chroma intra prediction using a linear model (LM) or any other model.

The signaling unit 190 may be configured to signal the parameters related to segmenting, such as segment threshold and segment thresholding method. If segmentation is performed by edge detection, the signaling unit 190 may also be configured to signal the parameters related to edge detection, such as a type of edge detection filter or any threshold associated with it. The signaling unit 190 may as well be configured to signal a binary segmentation mask. Apart from the parameters related to segmenting, the signaling unit may be configured to signal the parameters related to prediction, such as a linear prediction model and the corresponding coefficients.

The encoder 100 can be implemented in hardware, in software or a combination of hardware and software. The encoder 100 can be implemented in user equipment, such as a mobile telephone, tablet, desktop, netbook, multimedia player, video streaming server, set-top box or computer. The encoder 100 may also be implemented in a network device in the form of or connected to a network node, such as radio base station, in a communication network or system.

Although the respective units disclosed in conjunction with FIG. 9 have been disclosed as physically separate units in the device, where all may be special purpose circuits, such as ASICs (Application Specific Integrated Circuits), alternative embodiments of the device are possible where some or all of the units are implemented as computer program modules running on a general purpose processor. Such an embodiment is disclosed in FIG. 10.

Figure 10:
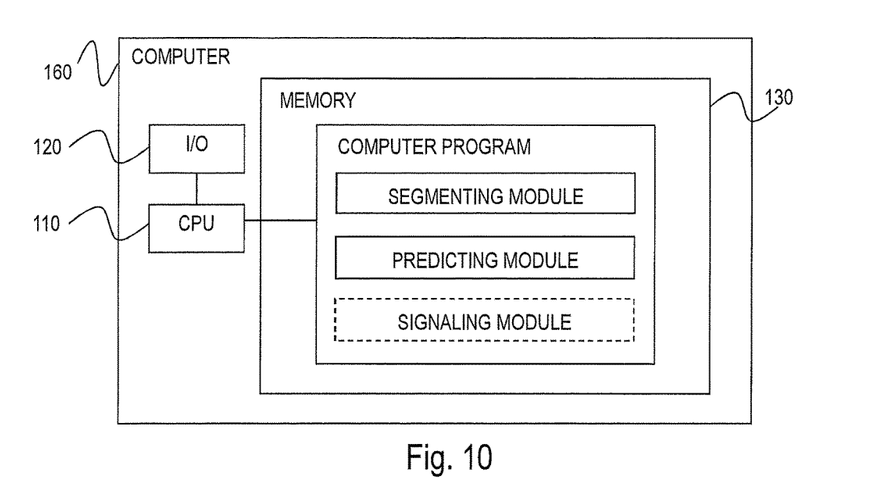
FIG. 10 is a schematic block diagram illustrating a computer comprising a computer program product with a computer program for encoding a picture of a video sequence, according to embodiments of the present invention.

FIG. 10 schematically illustrates an embodiment of a computer 160 having a processing unit 110 such as a DSP (Digital Signal Processor) or CPU (Central Processing Unit). The processing unit 110 can be a single unit or a plurality of units for performing different steps of the method described herein. The computer also comprises an input/output (I/O) unit 120 for receiving a video sequence. The I/O unit 120 has been illustrated as a single unit in FIG. 10 but can likewise be in the form of a separate input unit and a separate output unit.

Furthermore, the computer 160 comprises at least one computer program product 130 in the form of a non-volatile memory, for instance an EEPROM (Electrically Erasable Programmable Read-Only Memory), a flash memory or a disk drive. The computer program product 130 comprises a computer program 140, which comprises code means which, when run on the computer 160, such as by the processing unit 110, causes the computer 160 to perform the steps of the method described in the foregoing in connection with FIG. 3.

Figure 11:
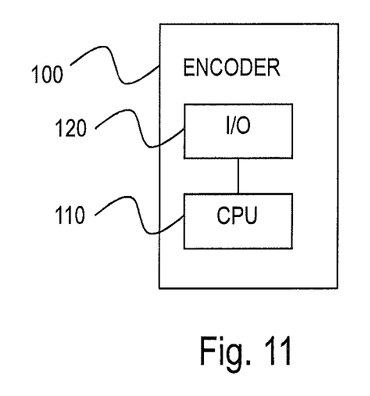

According to a further aspect, an encoder 100 is provided as illustrated in FIG. 11. The processing means are exemplified by a CPU (Central Processing Unit) 110. The processing means is operative to perform the steps of the method described in the foregoing in connection with FIG. 3. That implies that the processing means 110 are operative to segment the first block of samples 6 and the second block of samples 7 into at least a first segment 8 and a second segment 9 so that samples with the same picture positions in the first block 6 and the second block 7 belong to the same segment. That further implies that the processing means 110 are operative to predict sample values in the second block of samples 7 based on the sample values in the first block of samples 6 that belong to the same segment.

Figure 12:
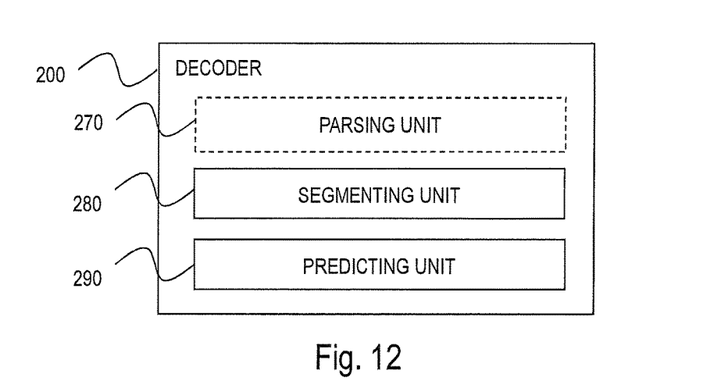
FIGS. 12 and 14 depict a schematic block diagram illustrating functional units of a decoder for decoding a bitstream comprising a coded picture of a video sequence according to embodiments of the present invention.

FIG. 12 is a schematic block diagram of a decoder 200 for decoding a bitstream 3 comprising a coded picture 11 of a video sequence 2. The coded picture 11 comprises at least a first coded color component 14 and a second coded color component 15, wherein the first coded color component 14 comprises a first coded block of samples 16 and the second coded color component 15 comprises a second coded block of samples 17. The decoder 200 comprises a segmenting unit 280 configured to segment the first coded block of samples 16 and the second coded block of samples 17 into at least a first 18 and a second 19 segment. The decoder 200 comprises a predicting unit 290 configured to predict sample values in the second coded block of samples 17 from the sample values in the first coded block of samples 16 that belong to the same segment. The decoder 200 optionally comprises a parsing unit 270 configured to parse the bitstream to obtain syntax information related to segmenting and/or predicting of blocks of samples. The parsing 270, segmenting 280, and predicting 290 units may be hardware based, software based (in this case they are called segmenting, predicting and signaling modules respectively) or may be a combination of hardware and software.

The decoder 200 may be an HEVC or H.264/AVC based decoder, or any other state of the art decoder that utilizes prediction of one coded color component based on another coded color component.

The segmenting unit 280 may segment a coded block of samples by thresholding so that samples having a value smaller than a threshold value belong to one segment and samples having a value larger than or equal to the threshold value belong to another segment. The segmenting unit 280 may also segment a coded block of samples by using one of: edge detection, Otsu's thresholding method, color-based segmentation, K-means clustering, image texture filters and spatial transform-based segmentation methods.

The predicting unit 290 may use a linear model to predict sample values in the second coded block of samples 17 based on the sample values in the first coded block of samples 16 that belong to the same segment. The predicting module 280 may use the CCP tool, as described above, or any other linear prediction model such as e.g. chroma intra prediction with linear model.

The optional parsing unit 270 may be configured to parse the bitstream to obtain syntax information related to segmenting and/or predicting of the blocks of samples. For example, the parsing unit 270 may be configured to parse a segmentation threshold from the bitstream. Alternatively, if segmentation is performed by edge detection, the parsing unit 270 may be configured to parse a type and threshold value for the edge detection filter used. The parsing unit 270 may be configured to parse linear prediction model coefficients, such as ResScaleVal1 and ResScaleVal2 in case of CCP, or any other prediction coefficients.

The decoder 200 can be implemented in hardware, in software or a combination of hardware and software. The decoder 200 can be implemented in user equipment, such as a mobile telephone, tablet, desktop, netbook, multimedia player, video streaming server, set-top box or computer. The decoder 200 may also be implemented in a network device in the form of or connected to a network node, such as radio base station, in a communication network or system.

Although the respective units disclosed in conjunction with FIG. 12 have been disclosed as physically separate units in the device, where all may be special purpose circuits, such as ASICs (Application Specific Integrated Circuits), alternative embodiments of the device are possible where some or all of the units are implemented as computer program modules running on a general purpose processor. Such an embodiment is disclosed in FIG. 13.

Figure 13:
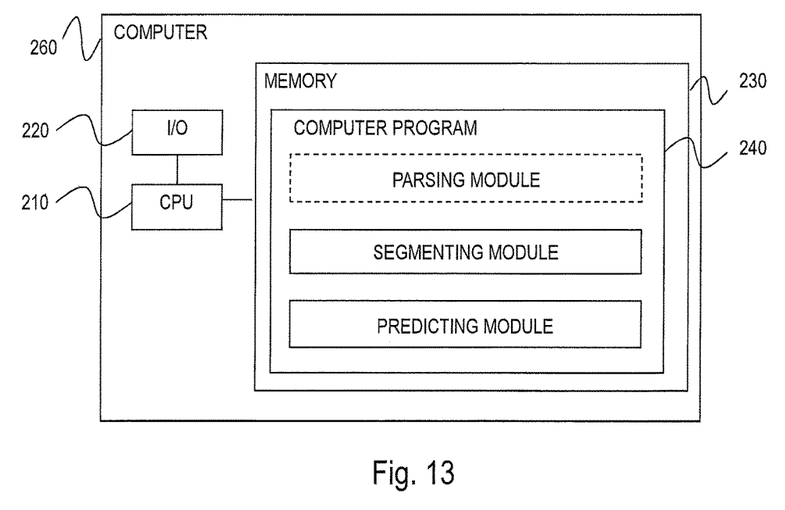
FIG. 13 is a schematic block diagram illustrating a computer comprising a computer program product with a computer program for decoding a bitstream comprising a coded picture of a video sequence according to embodiments of the present invention.

FIG. 13 schematically illustrates an embodiment of a computer 260 having a processing unit 210 such as a DSP (Digital Signal Processor) or CPU (Central Processing Unit). The processing unit 210 can be a single unit or a plurality of units for performing different steps of the method described herein. The computer also comprises an input/output (I/O) unit 120 for receiving a video sequence. The I/O unit 220 has been illustrated as a single unit in FIG. 13 but can likewise be in the form of a separate input unit and a separate output unit.

Furthermore, the computer 260 comprises at least one computer program product 230 in the form of a non-volatile memory, for instance an EEPROM (Electrically Erasable Programmable Read-Only Memory), a flash memory or a disk drive. The computer program product 230 comprises a computer program 240, which comprises code means which, when run on the computer 260, such as by the processing unit 210, causes the computer 260 to perform the steps of the method described in the foregoing in connection with FIG. 8.

Figure 14:
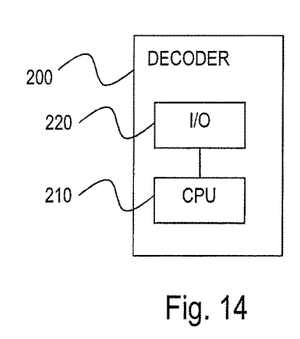

According to a further aspect, a decoder 200 is provided as illustrated in FIG. 14. The processing means are exemplified by a CPU (Central Processing Unit) 210. The processing means is operative to perform the steps of the method described in the foregoing in connection with FIG. 8. That implies that the processing means 210 are operative to segment the first coded block of samples 16 and the second coded block of samples 17 into at least a first 18 and a second 19 segment. The processing means 210 are further operative to predict sample values in the second coded block of samples 17 from the sample values in the first coded block of samples 16 that belong to the same segment. The processing means 210 are further optionally operative to parse the bitstream 3 to obtain syntax information related to segmenting and/or predicting of blocks of samples.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible.

The invention claimed is:

1. A method, performed by an encoder, for encoding a picture of a video sequence into a bitstream, wherein the picture comprises at least a luminance color component and a chrominance color component, wherein the luminance color component comprises a first block of luminance samples and the chrominance color component comprises a second block of chrominance samples, the method comprising:
  segmenting the first block of luminance samples and the second block of chrominance samples into:
    a first segment comprising first luminance samples from the first block and first chrominance samples from the second block that have the same first position as the first luminance samples in the first block; and
    a second segment comprising second luminance samples from the first block and second chrominance samples from the second block that have the same second position as the second luminance samples in the second block;
  predicting sample chrominance values in the second block of chrominance samples based on the sample values in the first block of luminance samples that belong to the same segment; and
  encoding, in the video bitstream, prediction parameters to obtain the predicted sample chrominance values at a decoder.

2. The method according to claim 1, wherein the first block of luminance samples originates from one of: the picture to be encoded, intra/inter prediction, residual or a combination of intra/inter prediction and residual.

3. The method according to claim 1, wherein segmenting is performed by thresholding so that luminance and chrominance samples having a value smaller than a segment threshold value belong to one segment and luminance and chrominance samples having a value larger than or equal to the segment threshold value belong to another segment.

4. The method according to claim 1, wherein segmenting is performed by using one of: edge detection, Otsu's thresholding method, color-based segmentation, K-means clustering, image texture filters and spatial transform-based segmentation methods.

5. The method according to claim 1, wherein the chrominance sample values in the second block of chrominance samples in at least one of the first and second segments are predicted based on the luminance sample values in the corresponding first and second segments in the first block of luminance samples by using a linear model.

6. The method of according to claim 1, wherein the prediction parameters include at least one of: a segment threshold, a segment thresholding method, and a binary mask of the segmentation.

7. The method according to claim 6 wherein the binary mask is coded according to a quad tree structure.

8. The method of claim 1, wherein the first block of luminance samples has a non-linear relationship with the second block of chrominance samples and the first segment has a linear relationship with the second segment.

9. The method of claim 1, wherein the prediction parameters comprise a first coefficient for the first segment and second coefficient for the second segment.

10. The method of claim 1, wherein the prediction parameters comprise a segmentation indicator that indicates whether to segment the first block of luminance samples and the second block of chrominance samples.

11. A method, performed by a decoder, for decoding a bitstream comprising a coded picture of a video sequence, wherein the coded picture comprises at least a luminance coded color component and a chrominance coded color component, wherein the luminance coded color component comprises a first coded block of luminance samples and the chrominance coded color component comprises a second coded block of chrominance samples, the method comprising:
  segmenting the first coded block of luminance samples and the second coded block of chrominance samples into:
    a first segment comprising first luminance samples from the first coded block and first chrominance samples from the second coded block that have the same first position as the first luminance samples in the first coded block; and
    a second segment comprising second luminance samples from the first block and second chrominance samples from the second block that have the same second position as the second luminance samples in the second block;
  predicting sample chrominance values in the second coded block of chrominance samples based on the sample values in the first coded block of luminance samples that belong to the same segment; and
  parsing the bitstream to obtain syntax information related to the predicted sample chrominance values.

12. The method according to claim 11, wherein the first coded block of luminance samples originates from one of: coded intra/inter prediction, residual and a combination of coded intra/inter prediction and residual.

13. The method according to claim 11, wherein segmenting is performed by thresholding so that luminance and chrominance samples having a value smaller than a segment threshold value belong to one segment and luminance and chrominance samples having a value larger than or equal to the segment threshold value belong to another segment.

14. The method according to claim 11 wherein the chrominance sample values in the second coded block of chrominance samples in at least one of the first and second segments are predicted based on the luminance sample values in the corresponding first and second segments in the first coded block of luminance samples by using a linear model.

15. The method of claim 11, wherein the first coded block of luminance samples has a non-linear relationship with the second coded block of chrominance samples and the first segment has a linear relationship with the second segment.

16. The method of claim 11, wherein the syntax information comprises a first coefficient for the first segment and second coefficient for the second segment.

17. The method of claim 11, wherein the syntax information comprises a segmentation indicator that indicates whether to segment the first coded block of luminance samples and the second coded block of chrominance samples.

18. An encoder that encodes a picture of a video sequence into a bitstream, wherein the picture comprises at least a luminance color component and a chrominance color component, wherein the luminance color component comprises a first block of luminance samples and the chrominance color component comprises a second block of chrominance samples, the encoder comprising:
- a processor; and
- a memory containing instructions executable by the processor to cause the processor to operate to:
  - segment the first block of luminance samples and the second block of chrominance samples into:
    - a first segment comprising first luminance samples from the first block and first chrominance samples from the second block that have the same first position as the first luminance samples in the first block; and
    - a second segment comprising second luminance samples from the first block and second chrominance samples from the second block that have the same second position as the second luminance samples in the second block;
  - predict sample chrominance values in the second block of chrominance samples based on the sample values in the first block of luminance samples that belong to the same segment; and
  - encode, in the video bitstream, prediction parameters to obtain the predicted sample chrominance values at a decoder.

19. The encoder of claim 18, wherein the prediction parameters comprise a first coefficient for the first segment and second coefficient for the second segment.

20. A decoder that decodes a bitstream, the decoder comprising a coded picture of a video sequence, wherein the coded picture comprises at least a luminance coded color component and a chrominance coded color component, wherein the luminance coded color component comprises a first coded block of luminance samples and the chrominance coded color component comprises a second coded block of chrominance samples, the decoder further comprising:
- a processor; and
- a memory containing instructions executable by the processor to cause the processor to operate to:
  - segment the first coded block of luminance samples and the second coded block of chrominance samples into:
    - a first segment comprising first luminance samples from the first coded block and first chrominance samples from the second coded block that have the same first position as the first luminance samples in the first coded block; and
    - a second segment comprising second luminance samples from the first block and second chrominance samples from the second block that have the same second position as the second luminance samples in the second block;
  - predict sample chrominance values in the second coded block of chrominance samples based on the sample values in the first coded block of luminance samples that belong to the same segment; and
  - parse the bitstream to obtain syntax information related to the predicted sample chrominance values.

21. The decoder of claim 20, wherein the syntax information comprises a first coefficient for the first segment and second coefficient for the second segment.

22. A computer program product comprising a non-transitory computer readable storage medium storing a computer program that encodes a picture of a video sequence into a bitstream, wherein the picture comprises at least a luminance color component and a chrominance color component, wherein the luminance color component comprises a first block of luminance samples and the chrominance color component comprises a second block of chrominance samples, the computer program when run on a computer causes the computer to:
- segment the first block of luminance samples and the second block of chrominance samples into:
  - a first segment comprising first luminance samples from the first block and first chrominance samples from the second block that have the same first position as the first luminance samples in the first block; and
  - a second segment comprising second luminance samples from the first block and second chrominance samples from the second block that have the same second position as the second luminance samples in the second block;
- predict sample chrominance values in the second block of chrominance samples based on the sample values in the first block of luminance samples that belong to the same segment; and
- encode, in the video bitstream, prediction parameters to obtain the predicted sample chrominance values at a decoder.

23. A computer program product comprising a non-transitory computer readable storage medium storing a computer program that decodes a bitstream comprising a coded picture of a video sequence, wherein the coded picture comprises at least a luminance coded color component and a chrominance coded color component, wherein the luminance coded color component comprises a first coded block of luminance samples and the chrominance coded color component comprises a second coded block of chrominance samples, the computer program when run on a computer causes the computer to:
- segment the first coded block of luminance samples and the second coded block of chrominance samples into:
  - a first segment comprising first luminance samples from the first coded block and first chrominance samples from the second coded block that have the same first position as the first luminance samples in the first coded block; and
  - a second segment comprising second luminance samples from the first block and second chrominance samples from the second block that have the same second position as the second luminance samples in the second block;
- predict sample chrominance values in the second coded block of chrominance samples based on the sample values in the first coded block of luminance samples that belong to the same segment; and
- parse the bitstream to obtain syntax information related to the predicted sample chrominance values.

* * * * *